United States Patent
Koskinen et al.

(10) Patent No.: US 7,116,968 B2
(45) Date of Patent: Oct. 3, 2006

(54) METHOD AND NETWORK SYSTEM FOR CHARGING A ROAMING NETWORK SUBSCRIBER

(75) Inventors: Juha-Pekka Koskinen, Hämeenlinna (FI); Juha Vallinen, Nokia (FI); Janne Siren, Lempäälä (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/511,542

(22) PCT Filed: Apr. 25, 2002

(86) PCT No.: PCT/IB02/01384

§ 371 (c)(1),
(2), (4) Date: Oct. 18, 2004

(87) PCT Pub. No.: WO03/092317

PCT Pub. Date: Nov. 6, 2003

(65) Prior Publication Data

US 2005/0181757 A1    Aug. 18, 2005

(51) Int. Cl.
  *H04M 11/00*    (2006.01)
  *H04L 12/66*    (2006.01)
(52) U.S. Cl. .................. 455/406; 455/408; 370/353; 379/114.01
(58) Field of Classification Search ........ 455/406–409, 455/432.1, 435.1, 405; 370/338, 352–356, 370/389, 401–404, 420, 442, 351; 379/114.01; 709/201, 203, 2; 705/40
See application file for complete search history.

(56) References Cited

U.S. PATENT DOCUMENTS

| | | | |
|---|---|---|---|
| 6,101,379 A | | 8/2000 | Rahman et al. |
| 6,377,982 B1 * | 4/2002 | Rai et al. | ..... 709/217 |
| 6,408,173 B1 * | 6/2002 | Bertrand et al. | ..... 455/406 |
| 6,463,275 B1 * | 10/2002 | Deakin | ..... 455/406 |
| 6,480,485 B1 * | 11/2002 | Kari et al. | ..... 370/352 |
| 6,515,989 B1 * | 2/2003 | Ronneke | ..... 370/389 |

(Continued)

FOREIGN PATENT DOCUMENTS

EP    1 065 838 A2    1/2001

(Continued)

*Primary Examiner*—Charles N. Appiah
(74) *Attorney, Agent, or Firm*—Squire, Sanders and Dempsey, LLP (57) ABSTRACT

The present invention relates to a method and network system for charging an account related to a terminal device (1) of a subscriber (A) to a first data network (10) for a network session rendered to the terminal device when roaming in a second data network (18). According to the method of the invention, upon registration of the terminal device to the second (visited) data network a network address of a first charging system (16) related to the home data network (10) of the terminal device (1) is transmitted from the home data network to the visited data network (18). When a network session is established for the terminal device (1) by the second data network, assessing of charge information about the network session will begin in the second data network in a real-time process. The saved network address of the charging system will be used for transmitting in real-time the assessed charge information from the second data network to the first charging system (16). The first charging system will calculate the charge for the network session using incoming charge information from the second network. The account related to the terminal device (1) will be charged so that the balance of the account is reduced by the charged amount.

42 Claims, 2 Drawing Sheets

U.S. PATENT DOCUMENTS

| | | | |
|---|---|---|---|
| 6,650,886 B1 * | 11/2003 | Lundstrom | 455/406 |
| 6,724,748 B1 * | 4/2004 | Stille et al. | 370/352 |
| 2002/0034298 A1 | 3/2002 | Gallagher et al. | |
| 2002/0068545 A1 * | 6/2002 | Oyama et al. | 455/406 |
| 2002/0191597 A1 * | 12/2002 | Lundstrom | 370/356 |
| 2003/0083991 A1 * | 5/2003 | Kikinis | 705/40 |
| 2003/0157925 A1 * | 8/2003 | Sorber et al. | 455/406 |
| 2004/0185826 A1 * | 9/2004 | Koskinen et al. | 455/406 |

FOREIGN PATENT DOCUMENTS

| | | | |
|---|---|---|---|
| GB | 2 350 017 A | * | 11/2000 |
| WO | WO 99/56492 | | 11/1999 |
| WO | WO 00/45611 | | 8/2000 |
| WO | WO 00/69201 | | 11/2000 |

* cited by examiner

METHOD AND NETWORK SYSTEM FOR CHARGING A ROAMING NETWORK SUBSCRIBER

FIELD OF THE INVENTION

The present invention relates to a method and network system for charging an account related to a terminal device of a subscriber to a first data network for a network session rendered to the terminal device when roaming in a second data network.

BACKGROUND OF THE INVENTION

Mobile telephony using a prepaid service has driven the growth of penetration rates in data networks in many markets. A prepaid service is a billing arrangement between an operator of a data network and a customer, hereinafter also called subscriber, where the subscriber deposits and amount of money in advance which is subsequently used to pay for usage of network services like for instance telephone calls, data transfer between a telephone or computer and data resources in the internet. Such usage of data network services will hereinafter be named network session.

To get full control of the customer credit, a prepaid service is usually based on an on-line charging process. Charging is understood as a set of functions whereby information related to a chargeable event (charge information) is formatted and transferred in order to make it possible to determine usage for which the charged party may be billed. A chargeable event maybe the transport of data between given terminal devices, e.g., telephones, handhelds or computers, through the bearer network, or a service rendered like establishing a radio transmission telephone session, or the delivery of content, like for instance stock market data stored in a database, etc. In an on-line charging process charging information can affect, in real-time, the service rendered. An on-line charging process therefore directly interacts with the network session control.

Due to its success in existing markets prepaid functionality is therefore an essential feature also for the growing third generation (3G) networks. To date, however, existing mechanisms do not allow providing full prepaid functionality to roaming subscribers. Currently offered prepaid services are not flexibly available in a visited network.

Some services use real-time charge calculation methods in which a calculation algorithm is implemented in a terminal device, e.g. in a chip integrated into a prepaid card. This method is expensive because it requires the implementation of the algorithm in each terminal device. It also restricts the flexibility of the charging system of the network operator since the algorithm can usually not be changed.

U.S. Pat. No. 6,226,364 describes a data network and method enabling real-time online charging of data network subscribers. The network's charging system may also obtain temporary service profiles for visiting roamers. For this the charging system downloads customer service information for the roamer from a roamer clearinghouse. The roamer's customer service information is then entered into the network's charging system as a temporary customer service profile and account for the roamer. As service is provided to the roamer, the billing system recalculates the prepaid balance or outstanding postpaid balance, and updates these parameters in the roamer's temporary customer service profile. Once the roamer stops receiving service from the host telephone service provider, the updated customer service information is posted back to the roamer clearinghouse.

This method has the disadvantage of requiring administrative effort for running the roamer's clearinghouse and for keeping temporary customer's files in the visited network. It is therefore complicated and expensive.

SUMMARY OF THE INVENTION

It is therefore an object of the present invention to provide a simple method for online charging an account related to a terminal device of a subscriber to a first data network for a network session rendered to the terminal device that allows to provide full and flexible pre-paid service when roaming in a second data network. It is another object of the invention to provide a network structure enabling in a simple way on-line charging of roaming network subscribers.

This object is achieved by a method according to claim 1 and a network system according to claim 25.

According to the method of the invention, upon registration of a terminal device subscribed to a first (home) data network to a second (visited) data network a network address of a first charging system related to the home data network of the terminal device is transmitted from the home data network to the visited data network. This network address uniquely identifies the first charging system to the visited network. The network address is saved in the second data network. When a network session is established for the terminal device by the second data network, assessing of a first charge information about the network session will begin in the second data network in a real-time process. The saved network address of the first charging system will be used for transmitting the assessed first charge information from the second data network to the first charging system. This process will continue as long as the network session is maintained. The first charging system will calculate the charge for the network session using incoming first charge information from the second network. The account related to the terminal device will be charged so that the balance of the account is reduced by the charged amount.

The first charge information is charge-relevant information pertaining to all the services rendered by the visited network in establishing and maintaining the network session. It may be bearer charge information. The assessed first charge information transmitted from the second network to the first network comprises subscriber information allowing to identify the terminal device and/or the account related to it. Subscriber information may for example be collected from the registration process of the roaming terminal device or from a subscriber register (e.g. Home Location Register (HLR) or Home Subscriber Server (HSS)) in the first data network. The assessed first or bearer charge information may comprise, for instance, calling and called telephone numbers, local and remote node names, date, starting time, amount of transferred data, and elapsed connection time of the call. The first charge information may be transmitted in the form of a call detail record (CDR).

The method of the invention breaks the as yet unquestioned habit of keeping the network address of the charging system of a data network as a secret to external networks. The network address of the charging system is, in the method of this invention, included to signaling also when network boundaries are crossed. This allows enhancing and accelerating the charging mechanism in a manner that is advantageous for both the customer and network operators in the home and visited networks.

The method of the invention allows the customer to use an on-line charging method for a roaming network session in the same manner as for a session provided by the home network. The customer can make full use of his prepaid credit amount without any change or restriction in service as compared to usage of his home data network. There is no additional manual registration process necessary for a network session. The automatic registration of the terminal device to the visited network may automatically start the method of the invention.

The operator of the home data network has the advantage of receiving within short time or immediately a feedback from the visited network on the charges he will face for use of the visited network by his customer. The charges to be paid by the operator of the home network to the operator of the visited network are balanced by the customer at the time of the session or immediately after the session. The operator of the home data network therefore remains in full control of his roaming customer's credit. He will know immediately when the balance of the customer's account is below a predetermined value. Furthermore, the operator may, according to his own policy, trigger the customer by a message to the terminal device to reload the prepaid account, cancel his network service to the customer or decide to give the customer further credit.

The step of assessing the first charge information in the second data network, which is performed by monitoring the network session, is preferably performed in near real-time or in real-time. "Real-time" in this context means that the charge assessment process is performed during the actual time that the related network session occurs, in order that results of the process can be used for immediately charging for the network session, and, if desired by a network operator, also for controling the network session. "Near real-time" means that there exists a certain delay between an event during the network session and the related charge assessment process, which delay is mostly due to data processing. However, a near real-time assessment process shall also be used for charging at least upon termination of the network session and, if possible, also for controling it.

Preferably, also the step of transmitting assessed first charge information from the second data network to the network address of the first charging system is performed in near real-time or in real-time. The accelerated processing involved in this embodiment concerns the data processing before and after the actual transmission process. The delay of the transmission process is, of course, not avoidable.

The steps of calculating the charge for the network session using incoming bearer charge information from the second network and of charging the account related to the terminal device are preferably performed in near real-time or real-time as well.

They may, however, also be delayed until the end of the network session has been signaled in the received bearer charge information.

The method of invention is most-preferably used for on-line charging of a prepaid account. The method of the invention may, with a slight change, also be used for on-line charging of roaming customers having post-paid billing arrangements with the operator of the first network. Instead of charging the customer's account during the network session or immediately after it, the charge information received from the visited data network may be saved and processed by a post-paid billing system.

In a preferred embodiment of the invention the method comprises the further steps of saving the assessed first or bearer charge information about the network session to a second charging system related to the second data network, calculation of a first or bearer charge for the network session by the second charging system using the saved first or bearer charge information and charging the first or bearer charge for the network session to a first operator of the first data network. This allows checking that payment from home network will be received. The mechanism enables charging using visited networks postpaid charging through the second charging system and home network prepaid charging through the first charging system in a flexible way. The operator of the home network may immediately pay the fraction of the calculated charge that goes to the operator of the visited network or wait for a bill. Using the method of this embodiment, there is no "surprise" for the operator or the customer by bills received later from the visited network due to the delayed billing system of the visited network. The operator has already deducted the money due for the bill has from the account of the subscriber using the online charging process.

In another embodiment of the invention the step of transmitting the network address of the charging system of the home network from the first (home) data network to the visited data network is performed before the step of registration of the terminal device to the second (visited) data network. I.e., the transmission of the address will happen irrespective of whether the terminal device will visit the second network at all. However, the second network can immediately recall the network address of the charging system of the first network, once this or any other terminal device subscribed to the first data network is roaming in the second network. This embodiment is especially advantageous for network alliances, i.e., contracting data networks guaranteeing each other support of network services. The process step of transmitting the network address of the charge system repeated for each registration of a roaming customer to a visited network of the network alliance is in this embodiment replaced by a single transmission of the address. The visited network may in this method store the network address of the first charging system (and that of other data networks) in a database.

In another preferred embodiment, the method comprises the further steps of assessing first-operator charge information related to the network session using the forwarded first or bearer charge information and transmitting the assessed second-operator charge information to the network address of the first charging system. Furthermore, calculation of charge for the network session by the first charging system is performed using in addition the incoming first-operator charge information. In this method the operator of the first network can immediately charge for use of the mobile phone if his policy provides for this possibility. The steps mentioned above are preferably performed in near real-time or even real-time. This method further increases the flexibility of the online charging mechanism of the invention.

Another preferred embodiment extends the applicability of the method of the invention to the frequent constellation in which usage of the services of the first network is provided to the customer through a third party, in the following also called second network operator. This embodiment comprises the further steps of transmitting and saving the network address of the first charging system from the first data network to a server related to the second operator of the first data network, forwarding in real-time from the first data network to the server the first or bearer charge information received from the second data network, assessing second-operator charge information related to the network session using the forwarded first or bearer charge information, and transmitting the assessed second-operator charge information to the network address of the first charging system. In this method, the calculation of the charge for the network session by the first charging system is performed using in addition the incoming second-operator charge information. Preferably, a near real-time or real-time implementation of this process is used.

This embodiment may in a similar manner as described above be extended by the further step of transmitting the assessed operator charge information from the server to a third charging system related to the second operator. The third charging system may output bills to the first network operator at a later stage or only be used to control the mutual payments between the first and second operators of the home network.

The method is applicable in many data network constellations. For instance, the network session may be established between the terminal device and a station in a third data network, which station may be, regarding the network session, a requested or a requesting station. Thus, the method of the invention is applicable for situations in which the roaming terminal device is the requesting partner as well as in alternative situations in which the roaming terminal device is the partner requested from a station subscribed to a third network. Also in the latter case the visited network will charge the home network to which the terminal device is subscribed for the providing the network session. The charge due may, however be negotiated between the operator of the home network and the operator of the third network.

In another preferred embodiment, there is a further step of establishing a control network session between the terminal device and the requesting or requested station in the third data network before the step of establishing the network session between the two terminal devices. The control network session is routed through a first network control node in the first data network. This embodiment allows transmitting the first or bearer charge information via the control network session.

The method of the invention is preferably applied to radio data networks, but may also be applied to cable networks. The method of the invention is most advantageous when the mentioned data networks are packet switched radio data networks, like GPRS (General Packet Radio Services) or UMTS (Universal Mobile Telecommunications System) networks.

According to another aspect of the invention, the problem is solved by the network system of claim 19. It comprises a first data network, a second data network, a first-network charging system related to the first data network, and a first terminal device subscribed to the first data network. The second data network has a second-network session control system adapted to establishing and maintaining a network session between the first terminal device and a requested or a requesting second terminal device. Further, a second-network service assessment system communicating with the second-network session control system is provided. It is adapted to assessing first or bearer charge information about the network session and transmitting it to the first-network charging system. The first-network charging system is adapted to transformation of balance information related to the first terminal device, the transformation depending on the balance information and on the incoming first or bearer charge information related to said first terminal device. For instance, given a previous balance of the account the transformation is performed calculating the difference between the previous balance and a charge calculated from the incoming charge information using a predetermined formula.

In the network structure of the invention, the first data network has a first-network service assessment system communicating with a second-network service assessment system in the second data network. The first-network service assessment system is adapted to transmit a network address of a first-network charging system to the second-network service assessment system. The second-network service assessment system is adapted to assess and to transmit first charge information during the network session to the first-network charging system using the network address.

With this network structure according to the invention, charging for roaming becomes fully functional for a subscriber of the first (home) data network also when roaming in the second data network.

The advantages of this network system are reflected in the advantages of the method of the invention described above. By the network system of the invention on-line call accounting can be handled within the home network.

It is noted that there may be more than two data networks in the network structure of the invention. Given a home data network of a subscriber, this home data network will have the elements of the first data network mentioned above, and the other ("visited") data networks of the network structure will have the elements of the second data network.

Both home and visited data networks may, in addition, have the elements of both first and second data networks so as to be able to allow online prepaid functionality to subscribers of all the data networks comprised by the network structure of the invention when roaming. For instance, the second data network will in this case also be equipped with a related charging system with properties corresponding to those of the first-network charging system mentioned above.

Preferably, the second network has a second-network session control system adapted to establish and maintaining a network session between the first network station and a terminating or an originating second network station.

In a preferred embodiment the network system comprises in addition a second-network charging system related to the second network and communicating with the second-network service assessment system. The second-network service assessment system is additionally adapted to transmit first or bearer charge information about the network session to the second-network charging system. This charging system is adapted to collecting the first or bearer charge information (CDRs) and extracting from it billing information that may be used for billing the operator of the first network later. The second-network charging system of this embodiment does therefore not make use of real-time charging mechanisms described above with reference to the first-network charging system. Thus, a second charging mechanism with the first data network is provided in addition to the online charging mechanism of the subscriber. This gives increased safety and billing control to the operator of the second network.

The network system of the invention makes it also simpler to offer services from a second operator ("3rd party") of the home network when the subscriber is roaming. In a preferred embodiment of the network structure, therefore, the network system additionally comprises a second-operator server, which is related to the first network and communicates with the first-network call session control system. The second-operator server is adapted to assessing in real-time second-operator charge information related to the network session using the first or bearer charge information and to transmitting in real-time the second-operator charge information to the first-network charging system. In this embodiment the first or bearer charge information is preferably forwarded in real-time to the second-operator server by the first-network session control system. The first-network charging system of this embodiment is adapted to the transformation of the balance information in additional dependence of the incoming second-operator charge information. In this embodiment the offered charging profiles can be more sophisticated, as there is no need to assume support from the visited network or the 3rd party.

Further advantageous developments are defined in the dependent claims.

BRIEF DESCRIPTION OF THE DRAWINGS

In the following, the present invention will be described in greater detail based on a preferred embodiment with reference to the drawings figures, in which.

DESCRIPTION OF THE PREFERRED EMBODIMENT

A first preferred embodiment will now be described on the basis of a network structure according to FIG. 1.

A terminal device, in this case a mobile station (MS) 1, for instance a mobile phone, is registered for a subscriber A for use of a first data network 10, hereinafter also called A's Home Public Land Mobile Network (A-HPLMN). A-HPLMN 10 is a GPRS network.

Details of the network structure of GPRS networks are well known and only shown here as far as they are relevant for the present invention. The network structure of the present invention can be implemented in any GPRS network known from prior art. In the embodiment of FIG. 1 it is assumed for simplicity that only one network operator offers the network services of A-HPLMN 10, and not any third party. Another preferred embodiment of the network structure of the present invention in which services of A-HPLMN 10 are offered also by a third party will be described below with reference to FIG. 2.

A-HPLMN 10 comprises a Serving Call State Control Function (S-CSCF) 12 and an Interrogating Call State Control Function (I-CSCF) 14. A-SCSCF12 and A-ICSCF14 are connected to exchange signaling information for session control.

A-SCSCF12 functions to control network services rendered to subscribers. Session control services rendered by A-SCSCF12 comprise registration, session control, proxy server functionality, i.e., accepting and either servicing internally or forwarding session requests, generation of call detail records (CDRs), and providing subscribers online with billing information. In generating CDRs, A-SCSCF12 works as a service assessment system for A-HPLMN 10. Instead of A-SCSCF12 there may be a plurality of SCSCFs within A-HPLMN 10 each performing one or several of the mentioned services and/or other known services not mentioned here.

A-ICSCF14 is the first point of contact in the home network for all connections destined to a terminal device of A-HPLMN 10, like MS 1. It is also the contact point for all connections destined to a roaming subscriber currently located within A-HPLMN 10. It serves to route call requests and forwards SIP (Session Initiation Protocol) requests to determined other S-CSCFs.

Use of the A-HPLMN 10 by MS 1 is charged with the aid of a charging system in the form of an online charging function (A-OCF) 16 to a prepaid account related to MS 1 and to subscriber A.

The network structure of the present embodiment further comprises a second GPRS network 18, hereinafter also called Visited Public Land Mobile Network 18 (V-PLMN). As for A-HPLMN 10, details of the network structure of V-PLMN 18 are only shown as far as they are relevant for the present invention.

V-PLMN 18 has a GPRS backbone 20 connecting a Serving GPRS Serving Node (V-SGSN) 22 with a Gateway GPRS Serving Node (V-GGSN) 24. The V-SGSN 22 keeps track of the individual MSs' location and performs security functions and access control. The V-GGSN 24 provides interworking with external packet-switched networks. Another network element shown is a Proxy Call State Control Function 26 (V-PCSCF). V-PCSCF 26 finds the home network for a roaming terminal device, relays messages to the corresponding S-CSCF at the home network and provides some translation, security and authorization functions.

For offline charging V-PLMN 18 is communicating with a Charging Collection Function (CCF) 28. CCF 28 performs charging functions for post paid billing in much the same way as A-OCF 16, which will be described below.

Also shown is B-HPLMN 30, the home GPRS network of a subscriber B, to which a network session shall be established.

It is noted that for reasons of simplicity charging for the network service provided by B-HPLMN 30 is not taken into account in FIG. 1 nor in the embodiment of FIG. 2 below. However, the necessary provisions are obvious from what is described here.

B-HPLMN 30 comprises a Serving Call State Control Function (B-SCSCF) 32 communicating with a Proxy Call State Control Function 34 (B-PCSCF), a Gateway GPRS Serving Node (V-GGSN) 36, and IP GPRS backbone 38 and a Serving GPRS Serving Node (B-SGSN) 40. A mobile station 42 is registered to B-HPLMN 30 for a subscriber B.

Thus, when MS 1 requests a network session the request is forwarded in a control session through V-SGSN 22, V-GPRS IP backbone 20 and V-GGSN 24 to V-PCSCF 26. V-PCSCF 26 establishes control session communication with A-HPLMN 10 through A-SCSCF 12 and A-ICSCF 14. A-ICSCF 14 connects to B-SCSCF 32 from where the request is forwarded through B-PCSCF 34, B-GGSN 36, B-GPRS backbone 38 and B-SGSN 40 to MS 42. Dashedline arrows in FIG. 2 show routing of the control session. Fat solid-line arrows show routing of the data network session from MS1 to MS 42.

Upon establishing of the data session V-SGSN 22 starts a charging session to V-CCF 28. In addition, an online charging session to A-OCF 16 is started which is symbolized in FIG. 1 by a thin solid-line arrow 44. The address of A-OCF 16 has been downloaded to V-SGSN 22. For the online charging session, the call detail records (CDRs) created by V-SGSN 22 are routed along the control session connection to A-SCSCF 12. A-SCSF 12 forwards the incoming CDRs to A-OCF 16.

A-SCSCF 12 also sends its own CDRs containing operator charge information to A-OCF-16. The thin solid-line arrow 46 represents this real-time online charging session between A-SCSCF 12 and A-OCF-16.

Operator charges may comprise bearer charges for use of the home GPRS network 10, session charges for individual sessions hosted by A-HPLMN, and event charges for services used related to certain events, for instance, transmission of audio and/or video data related to a concert, television program, etc. Session charges and event charges are included in the operator charge information mentioned above.

Charging the account of MS 1 using A-OCF 16 is performed by a charging process in which charging information can affect in real-time the service rendered. A-OCF 16 therefore directly interacts with the session control at the A-SCSCF12.

The charging information arriving at A-OCF 16 takes the form of CDRs containing a record of voice or data switched virtual circuits (SVCs) including the calling and called telephone numbers, local and remote node names, date, starting time, amount of transferred data, and elapsed connection time of the call.

By applying a predetermined real-time transformation algorithm to the incoming CDRs A-OCF 16 transforms incoming charging information related to MS 1 into accounting information that represents an amount of money to be charged to the account related to MS 1.

Figure 1:
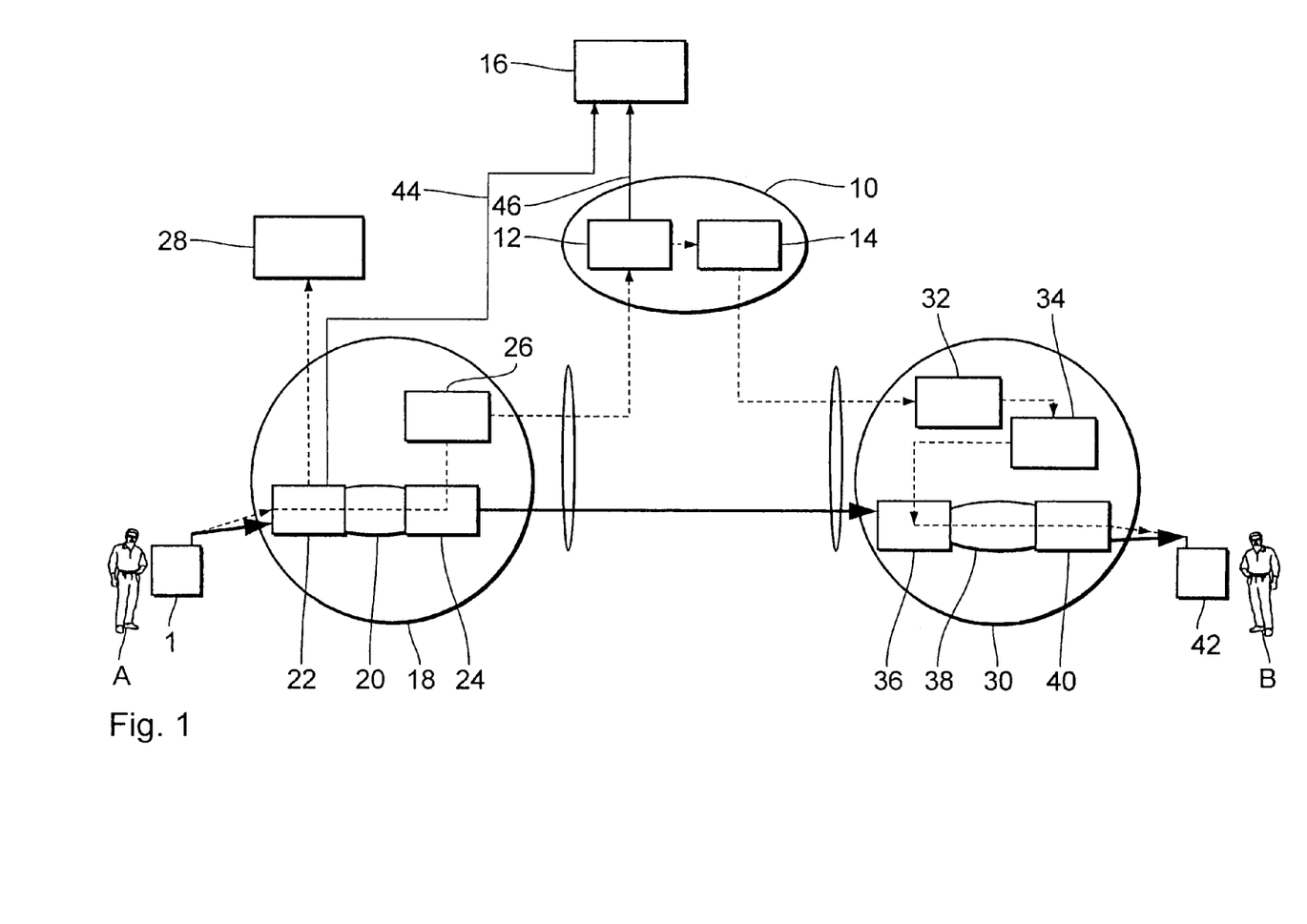
FIG. 1 shows in the form of a schematic diagram a first embodiment of a GPRS-based network system.
Figure 2:
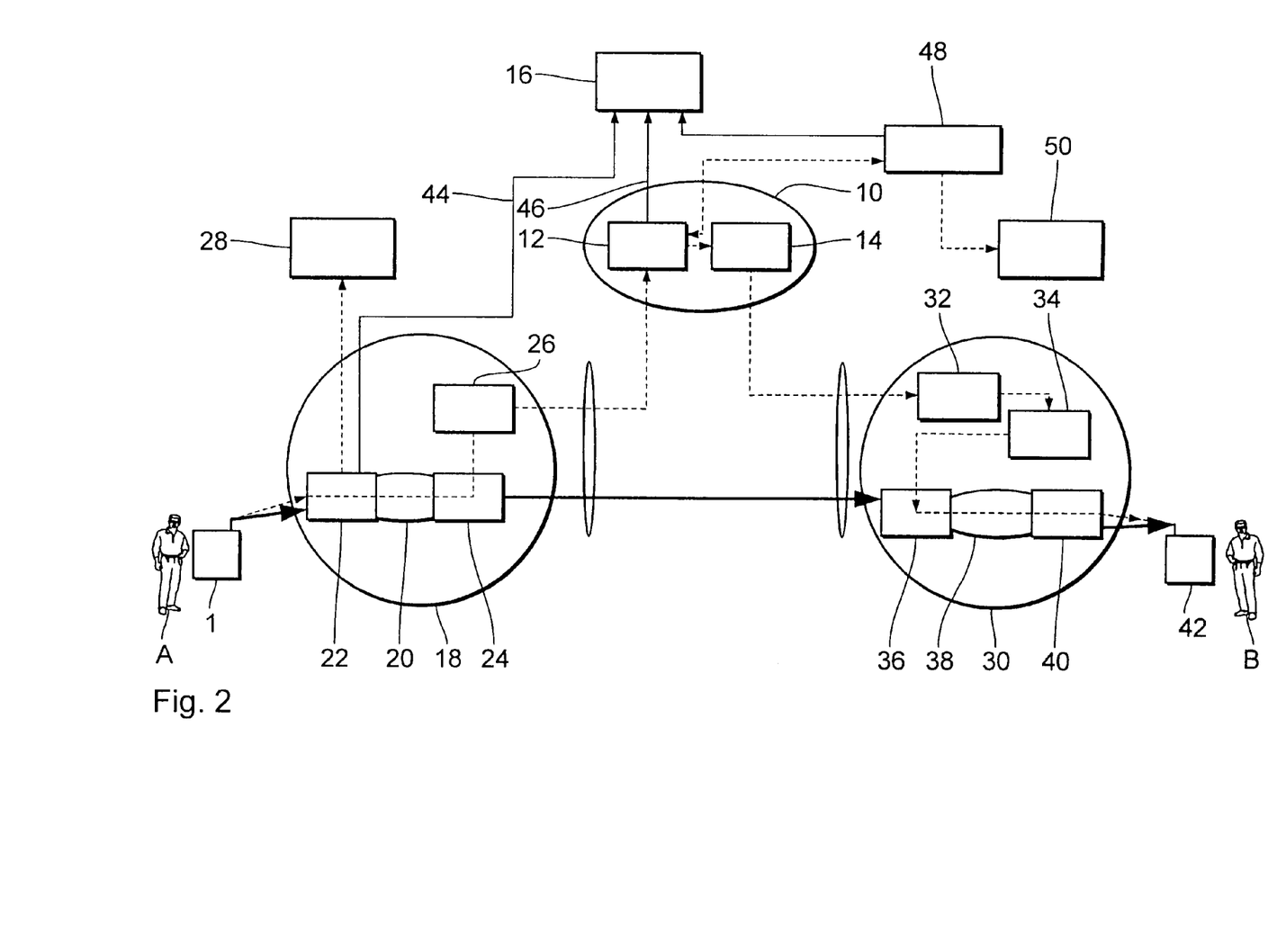
FIG. 2 shows in the form of a schematic diagram a second embodiment of a GPRS-based network system.

The incoming charging information in the embodiment of FIG. 1 is bearer charge information from V-HPLMN 18 and operator charge information from A-SCSCF12. Which transformation algorithm is used to determine the charge for the current network session may depend on further subscriber information. The subscriber information may for instance include special charging conditions for use of MS1 at certain times, places, for certain kinds of network session, etc. The A-OCF 16 therefore communicates with a subscriber information register or database (not shown).

In a real-time accounting process the accounting information is used by A-OCF 16 to transform and store the balance information related to the account of MS1. That means, the calculated charge is subtracted from the previous balance and the corresponding new balance is stored.

In practice, implementation of the A-OCF 16 may take the form of a charging gateway (CG), or A-HPLMN 10 communicating with an external CG. A-OCF 16 is sometimes also named Prepaid Server.

A second preferred embodiment of the network structure of the invention will now be described with reference to FIG. 2. The network structure of FIG. 2 resembles that of FIG. 1. Therefore, the same reference numbers will be used for corresponding elements. The following description concentrates on the differences between the network structures of FIGS. 1 and 2.

In addition to the network structure of FIG. 1 the present embodiment comprises a server 48 related to a second operator ($3^{rd}$ party) of H-PLMN 10. The second operator provides enhanced services to subscriber A and may himself be considered a subscriber of H-PLMN 10. For his additional service, the second operator will charge subscriber A. To achieve this, server 48 communicates with A-SCSCF 12. The server 48 is adapted to assessing in real-time second-operator charge information related to the network session using the bearer charge information. The second-operator charge information in the form of a CDR is transmitted in real-time to A-OCF 16 through A-SCSCF 12. In this embodiment the server obtains the bearer charge information from V-SGSN 22 through A-SCSCF 12.

A-OCF 16 is in this embodiment is adapted to the transformation of the balance information in additional dependence of the incoming second-operator CDRs.

In addition to the online charging process just described the CDRs communicated to A-OCF 16 will also be transmitted to a Charge Collection Function (O-CCF) 50. O-CCF 50 corresponds to V-CCF 28 and provides the same functions to the second operator as V-CCF 28 does the operator of V-PLMN 18, as described with reference to FIG. 1.

It is noted that the present invention is not restricted to the specific features of the above preferred embodiment, but can be used in all types of communications networks such as GSM systems including circuit switched or packet switched systems. The invention is of course also applicable to any other communication network effecting mobile or fixed communication. Particularly, the invention is also applicable to pure packet switched networks like the future IP-based networks. Any kind of party's identifier data and party's equipment identifier data may be stored in the database, based on which the correspondence is checked and new entries are added. The preferred embodiment may thus vary within the scope of the attached claims.

The invention claimed is:

1. A method for charging an account related to a terminal device of a subscriber to a first data network for a network session rendered to said terminal device when roaming in a second data network, comprising the steps of
registering said terminal device to said second data network,
transmitting a network address of a first charging system related to said first data network from said first data network to said second data network,
establishing said network session for said terminal device by said second data network,
assessing in said second data network first charge information about said network session,
transmitting said assessed charge information from said second data network to said network address of said first charging system, and
calculating a charge for said network session at said first charging system using said incoming first charge information,
wherein said step of transmitting said network address of said first charging system from said first data network to said second data network is performed before said step of registering said terminal device to said second data network.

2. A method according to claim 1, comprising the further steps of
saving said assessed first charge information about said network session to a second charging system related to said second data network,
calculating a charge for said network session by second charging system using said saved first charge information,
charging said charge for said network session to a first operator of said first data network.

3. A method according to claim 2, in which said first charge information saved to said second charging system is marked with a flag indicating that said first charge information is related to a subscriber of said first data network.

4. A method according to claim 2, in which said charge is charged after termination of said network session.

5. A method according to claim 1, in which said first charge information is a bearer charge information.

6. A method according to claim 1, in which said step of assessing a first charge information in said second data network is performed in near real-time or in real-time.

7. A method according to claim 1, in which said step of transmitting said assessed first charge information from said second data network to said network address of said first charging system is performed in near real-time or in real-time.

8. A method according to claim 1, in which charging said account is performed in near real-time or in real-time.

9. A method according to claim 1, in which charging said account is performed online.

10. A method according to claim 1, further comprising a step of transmitting subscriber information from said first data network to said second data network before said step of establishing said network session.

11. A method according to claim 10 comprising, before said step of establishing said network session between terminal device in said second data network and said station in said third data network, a further step of establishing a control network session between said terminal device and said station, which control network session is routed through a first network control node related to said first data network.

12. A method according to claim 11 in which said first charge information is transmitted via said control network session.

13. A method according to claim 1, with the further steps of
assessing first-operator charge information related to said network session using said forwarded first charge information,
transmitting said assessed second-operator charge information to said network address of said first charging system,
and in which calculation of charge for said network session by said first charging system is performed using in addition said incoming first-operator charge information.

14. A method according to claim 13, in which the step of assessing first-operator charge information related to said network session using said forwarded first charge information is performed in near real-time or in real-time.

15. A method according to claim 13, in which the step of transmitting said assessed second-operator charge information to said network address of said first charging system is performed in near real-time or in real-time.

16. A method according to claim 1, in which said subscriber is subscribed to said first data network through a second network operator, comprising the further steps of
transmitting and saving said network address of said first charging system from said first data network to a server related to said second operator of said first data network,
forwarding from said first data network to said server said first charge information received from said second data network,
assessing second-operator charge information related to said network session using said forwarded first charge information,
transmitting said assessed second-operator charge information to said network address of said first charging system,
and in which calculation of charge for said network session by said first charging system is performed using in addition said incoming second-operator charge information.

17. A method according to claim 16, comprising the further step of transmitting said assessed operator charge information from said server to a third charging system related to said second operator.

18. A method according to claim 17, in which said operator charge is charged after termination of said session by said third charging system to said first operator of said first data network.

19. A method according to claim 16, in which said data networks are packet switched radio data networks.

20. A method according to claim 1 in which said account charged is a prepaid account.

21. A method according to claim 1 in which said steps of calculation of a charge for said network session by said first charging system using said incoming first charge information and charging said account are performed in real-time.

22. A method according to claim 1 in which said network session is established between said terminal device and a station in a third data network, which station is, regarding said network session, an originating or a terminating station.

23. A method according to claim 1, in which at least one of said data networks is a radio data network.

24. A network system comprising
a first data network,
at least one second data network,
a first-network charging system related to said first data network, and
a first terminal device subscribed to said first data network, wherein
said first data network has a first-network service assessment system communicating with a second-network service assessment system in said second data network and adapted to transmit a network address of said first-network charging system to said second-network service assessment system, and
said second-network service assessment system is adapted to assess and to transmit first charge information during said network session to said first-network charging system using said network address,
wherein said first-network service assessment system is additionally adapted to performing said step of transmitting said network address of said first charging system from said first data network to said second data network before a step of registering said first terminal device to said second data network.

25. A network system according to claim 24, comprising in addition a second-network charging system related to said second network and communicating with said second-network service assessment system, in which said second-network service assessment system is additionally adapted to transmit said first charge information about said network session to said second-network charging system.

26. A network system according to claim 24, comprising a second-network session control system adapted to establish and maintain a network session between the first network station and a terminating or an originating second network station.

27. A network system according to claim 24, in which, to perform said transmission of said first charge information from said second-network service assessment system to said first-network charging system, said second-network session control system is additionally adapted to transmit said first charge information to said first-network session control system, and said first-network control system is additionally adapted to transmit said received first charge information to said first-network charging system.

28. A network system according to claim 24, in which the first-network charging system is adapted to transforming balance information related to the first network station, the transformation depending on the balance information and on the incoming first charge information related to said first network station.

29. A network system according to claim 28, in which the first-network charging system is adapted to perform said transformation in near real-time or real-time.

30. A network system according to claim 24, in which said second-network service assessment system is adapted to assess and to transmit in near real-time or real-time said first charge information during said network session to said first-network charging system using said network address.

31. A network system according to claim 24, in which said first charge information is a bearer charger information.

32. A network system according to claim 24, in which said first-network session control system is additionally adapted to assess during said network session and to transmit to said first-network charging system first-operator charge information depending on said received charge information, and in which said first-network charging system is adapted to transform said balance information in additional dependence of said incoming first-operator charge information.

33. A network system according to claim 24, which additionally comprises a second-operator server which is related to said first data network and communicates with said first-network call session control system, and which is adapted to assess second-operator charge information related to said network session using said first charge information and to transmit said second-operator charge information to said first-network charging system, and in which said first-network charging system is adapted to transform said balance information in additional dependence of said incoming second-operator charge information.

34. A network system according to claim 33, comprising in addition a second-operator charge system related to said first data network and communicating with said second-operator server, in which said second-operator server is additionally adapted to transmit second-operator charge information about said network session to said second-network charge system.

35. A network system according to claim 24 in which the first charging system is adapted to apply a real-time transformation algorithm to said types of incoming charge information.

36. A network system according to claim 24, in which said first and second networks are GPRS Public Land Mobile Networks.

37. A network system according to claim 36, in which said second-network session control system comprises a serving GPRS support node (SGSN), a GPRS Internet Protocol backbone, and a Gateway GPRS support node (GGSN).

38. A network system according to claim 37 in which said second-network service assessment system is integrated into said SGSN.

39. A second-network service assessment system in a second data network, the second-network service assessment system comprising:
    a receiver configured to receive a network address of a first-network charging system from a first-network service assessment system in a first data network;
    an assessor configured to assess first charge information; and
    a transmitter configured to transmit the first charge information during a network session to the first-network charging system using the network address,
    wherein the receiver is further configured to receive the network address of the first charging system before a first terminal device has been registered to the second data network, and
    wherein communications between the second-network service assessment system and first-network service assessment system are related to a registration of the first terminal device to the second data network.

40. The second-network service assessment system according to claim 39, wherein the receiver and the transmitter are configured to communicate with a second-network charging system related to the second network, and
    wherein the transmitter is further configured to transmit the first charge information about the network session to the second-network charging system.

41. The second-network service assessment system according to claim 39, wherein the second-network service assessment system is configured to assess and to transmit in near real-time or real-time the first charge information during the network session to the first-network charging system using the network address.

42. The second-network service assessment system according to claim 39, wherein the second-network service assessment system is integrated into an SGSN.

* * * * *